US011187564B2

United States Patent
Bell et al.

(10) Patent No.: US 11,187,564 B2
(45) Date of Patent: Nov. 30, 2021

(54) VIBRATORY FLOW METER WITH MULTICHANNEL FLOW TUBE

(71) Applicant: Micro Motion, Inc., Boulder, CO (US)

(72) Inventors: Mark James Bell, Longmont, CO (US); Joel Weinstein, Boulder, CO (US); Mitalee Nayan Desai, Boulder, CO (US); Clinton R. Griffin, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/637,009

(22) PCT Filed: Aug. 23, 2017

(86) PCT No.: PCT/US2017/048139
§ 371 (c)(1),
(2) Date: Feb. 6, 2020

(87) PCT Pub. No.: WO2019/040053
PCT Pub. Date: Feb. 28, 2019

(65) Prior Publication Data
US 2020/0240823 A1    Jul. 30, 2020

(51) Int. Cl.
*G01F 1/84*    (2006.01)
(52) U.S. Cl.
CPC .......... *G01F 1/8477* (2013.01); *G01F 1/8422* (2013.01); *G01F 1/8427* (2013.01); *G01F 1/8431* (2013.01); *G01F 1/8495* (2013.01)
(58) Field of Classification Search
CPC ............................. G01F 1/8477; G01F 1/8495
See application file for complete search history.

(56) References Cited

U.S. PATENT DOCUMENTS

| 4,252,028 A | 2/1981 | Smith et al. |
| 8,596,143 B2 * | 12/2013 | Rieder .................... G01F 15/02 |
| | | 73/861.357 |
| 2011/0023626 A1 | 2/2011 | Joel |

FOREIGN PATENT DOCUMENTS

| JP | S62170819 A | 7/1987 |
| JP | H09133564 A | 5/1997 |
| WO | 2017200518 A1 | 11/2017 |

OTHER PUBLICATIONS

Basse Nils T Ed—Hampel Uwe: "A review of the theory of Coriolis flowmeter measurement errors due to entrained particles", Flow Measurement and Instrumentation, Butterworth-Heinemann, Oxford, GB, vol. 37, Apr. 13, 2014 (Apr. 13, 2014), pp. 107-118, XP029021098, ISSN: 0955-5986, DOI: 10.1016/J.FLOWMEASINST.2014.03. 009.

(Continued)

*Primary Examiner* — Erika J Villaluna
(74) *Attorney, Agent, or Firm* — The Ollila Law Group LLC (57) ABSTRACT

Vibratory meters (5), and methods for their use measuring a fluid are provided. Each vibratory meter includes a multichannel flow tube (300) comprising two or more fluid channels (302), a pickoff (170), a driver (180), and meter electronics (20) configured to apply a drive signal to the driver at a drive frequency ω, and measure a deflection of the multichannel flow tube with the pickoff. At least one fluid channel has an effective diameter that is related to the length of the flow tube.

14 Claims, 8 Drawing Sheets

(56) References Cited

OTHER PUBLICATIONS

Kutin J et al: "Velocity profile effects in Coriolis mass flowmeters: Recent findings and open questions", Flow Measurement and Instrumentation, Butterworth-Heinemann, Oxford, GB, vol. 17, No. 6, Dec. 1, 2006 (Dec. 1, 2006), pp. 349-358, XP024961019, ISSN: 0955-5986, DOI: 10.1016/J.FLOWMEASINST.2006.07.005 [retrieved on Dec. 1, 2006].

Weinstein Joel, Emerson Process Management—Micro Motion Inc: "Multiphase Flow in Coriolis Mass Flow Meters—Error Sources and Best Practices", 28th International North Sea Flow Measurement Workshop, Oct. 26-29, 2010, Paper 7.2.

Fischer Paul F et al: "Influence of Wall Proximity on the Left and Drag of a Particle in an Oscillatory Flow", Mathematics and Computer Science Division, Argonne National Laboratory Argonne, IL 60439, USA, Department of Mathematics and Department of Physics, University of Arizona, Tucson, AZ 85721, USA.

Weinstein Joel Aaron: "The Motion of Bubbles and Particles in Oscillating Liquids with Applications to Multiphase Flow in Coriolis Flow Meters", a thesis submitted to the faculty of the Graduate School of the University of Colorado in partial fulfillment of the requirement for the degree of Doctor of Philosophy, Department of Mechanical Engineering 2008, University of Colorado, Boulder, Colorado, USA.

\* cited by examiner

VIBRATORY FLOW METER WITH MULTICHANNEL FLOW TUBE

TECHNICAL FIELD

The examples described below relate to vibratory meters and methods for using vibratory meters. More particularly, the examples are directed to vibratory meters including multichannel flow tubes.

TECHNICAL FIELD

Vibratory meters, such as Coriolis mass flowmeters and vibrating densitometers, typically operate by detecting motion of a vibrating flow tube that contains a flowing material. Properties associated with the material in the flow tube, such as mass flow, density and the like, can be determined by processing measurement signals received from motion transducers associated with the flow tube. Vibratory meters have meter assemblies with one or more flow tubes of a straight or curved configuration. Each flow tube configuration in a Coriolis mass flow meter, for example, has a set of natural vibration modes, which may be of simple bending, torsional, or coupled type. Each flow tube can be driven to oscillate at a preferred mode. When there is no flow through the flowmeter, a driving force applied to the flow tube(s) causes all points along the flow tube(s) to oscillate with identical phase or with a small "zero offset", which is a time delay measured at zero flow.

As material begins to flow through the flow tube(s), Coriolis forces cause each point along the flow tube(s) to have a different phase. For example, the phase at the inlet end of the flowmeter lags the phase at the centralized driver position, while the phase at the outlet leads the phase at the centralized driver position. Pickoffs on the flow tube(s) produce sinusoidal signals representative of the motion of the flow tube(s). Signals output from the pickoffs are processed to determine the time delay between the pickoffs. The time delay between the two or more pickoffs is proportional to the mass flow rate of material flowing through the flow tube(s).

A meter electronics connected to the driver generates a drive signal to operate the driver, and to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the flow tube(s) at a desired flow tube amplitude and frequency. It is also known in the art to provide the pickoffs as a magnet and coil arrangement very similar to the driver arrangement.

Entrained gas in liquid and wet gases are common application problems for Coriolis flow meters, especially in the oil and gas production industry. The particles, or gas bubbles/liquid droplets that form inside of a bulk fluid can decouple from the bulk fluid when the vibratory meter is vibrated. Additionally, velocity of sound (VOS) effects found in multiphase fluids and single phase gases can cause further measurement errors. Flow profile effects are another area of concern for all types of flow meters. When a Reynolds number is low, typically due to high viscosity of a fluid in the flow meter, there are viscosity-related effects, which can reduce the sensitivity of a flow meter. Larger meters, which have a smaller tube length to tube diameter ratio, can be more adversely affected.

Prior solutions to the challenges of measuring multiphase fluids have incorporated ways to identify and/or filter out decoupling errors from measurements, and have included: alarm handling, signal processing and noise rejection, and wider mode separation into vibratory meters. While the prior solutions have provided some improvements, meter performance has continued to be impacted by decoupling errors.

Prior solutions to the challenges of VOS effects have included measuring the speed of sound and the pressure of the process fluid to estimate the measurement errors caused. Other methods including user entry of fluid data have also been proposed. Including additional sensors and detectors with a flowmeter adds complexity to a flowmeter, however, which is undesirable, and fluid property data entered by users can be entered incorrectly, or can vary over time.

Prior solutions to the challenges of flow profile effects have included providing flow meters with relatively long flow tube lengths. While this solution has provided a flow meter with fewer measurement errors, the larger flow meter dimensions that result are not appropriate for many process applications.

Accordingly, there is a need for flow tubes and flow meters that can accurately measure a flow rate of a fluid in view of multiphase, decoupling, VOS, or flow profile effects by removing the source of the errors themselves. Such solutions can be realized with a multichannel flow tube.

SUMMARY

A method of measuring a fluid with a vibratory flow meter including a multichannel flow tube is provided. The method comprises flowing the fluid into two or more fluid channels in the multichannel flow tube, the two or more channels formed by a tube perimeter wall and one or more channel divisions extending along at least a portion of the tube perimeter wall, applying a drive signal to a driver coupled to the multichannel flow tube, the driver being configured to vibrate the multichannel flow tube in response to the drive signal, and measuring a deflection of the multichannel flow tube with a pickoff attached to the multichannel flow tube, wherein the multichannel flow tube has an active tube length L, and an effective diameter $d_{eff}$ of at least one of the two or more fluid channels is:

$$d_{eff} \leq \frac{L}{25}.$$

A vibratory meter (5) including a multichannel flow tube (300, 400, 500) is provided. The vibratory meter comprises a pickoff (170l, 170r) attached to the multichannel flow tube, a driver (180) coupled to the multichannel flow tube, the driver being configured to vibrate the multichannel flow tube, the multichannel flow tube comprising two or more fluid channels (302, 402, 502) formed by a tube perimeter wall (304, 404, 504) and one or more channel divisions (306, 406, 506) extending along at least a portion of the tube perimeter wall, the multichannel flow tube having an active tube length L, and an effective diameter $d_{eff}$ (1114) of at least one of the two or more fluid channels being:

$$d_{eff} \leq \frac{L}{25}.$$

ASPECTS

According to a further aspect, the fluid may be a multiphase fluid.

According to a further aspect, each of the two or more fluid channels may have the effective diameter $d_{eff}$ in at least a first dimension.

According to a further aspect, at least one of the two or more fluid channels may have an effective diameter $d_{eff}$ in a first dimension and a second dimension.

According to a further aspect, the effective diameter $d_{eff}$ of the two or more fluid channels may be less than 0.3 inches.

According to a further aspect, the tube perimeter wall of the multichannel flow tube may be substantially circular.

According to a further aspect, the one or more channel divisions may be substantially straight.

According to a further aspect, the one or more channel divisions may be substantially circular.

According to a further aspect, each of the two or more fluid channels may have the effective diameter $d_{eff}$ in a first dimension.

According to a further aspect, at least one of the two or more fluid channels may have an effective diameter $d_{eff}$ in a first dimension and a second dimension.

According to a further aspect, the one or more channel divisions may be substantially straight.

According to a further aspect, the one or more channel divisions may be substantially circular.

According to a further aspect, the effective diameter $d_{eff}$ of the two or more fluid channels may be less than 0.3 inches.

BRIEF DESCRIPTION OF THE DRAWINGS

The same reference number represents the same element on all drawings. The drawings are not necessarily to scale.

DETAILED DESCRIPTION

The present disclosure describes vibratory meters including multichannel flow tubes, and methods of measuring a fluid with a vibratory flow meter including a multichannel flow tube.

Figure 1:
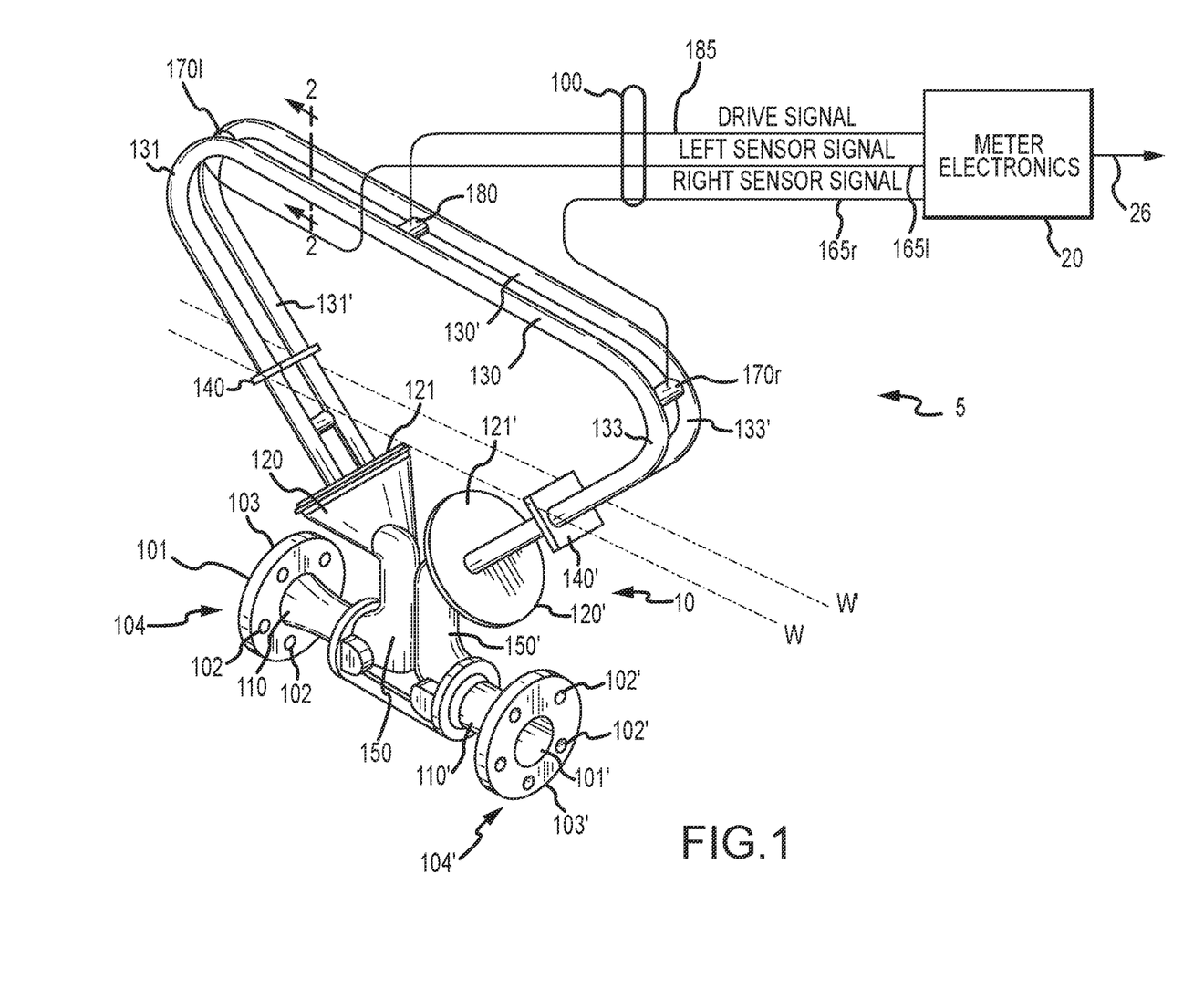
FIG. 1 depicts a vibratory flowmeter, in accordance with an example.

FIG. 1 depicts a vibratory meter 5 with a multichannel flow tube 130 in accordance with an example. As shown in FIG. 1, the vibratory meter 5 comprises a meter assembly 10 and meter electronics 20. The meter assembly 10 responds to the mass flow rate and density of a process material. The meter electronics 20 is connected to the meter assembly 10 via leads 100 to provide density, mass flow rate, and temperature information over communications path 26, as well as other information. Information and commands may be further received at meter electronics 20 over communications path 26.

A Coriolis flow meter structure is described, although this is not intended to be limiting. Those of skill will readily understand that the present Application could be practiced as a vibrating tube densitometer, tuning fork densitometer, or the like.

The meter assembly 10 includes a pair of manifolds 150 and 150', flanges 103 and 103' having flange necks 110 and 110', a pair of parallel multichannel flow tubes 130 and 130', driver 180, and a pair of pick-off sensors 170l and 170r. Multichannel flow tubes 130 and 130' have two essentially straight inlet legs 131, 131' and outlet legs 133, 133', which converge towards each other at flow tube mounting blocks 120 and 120'. The multichannel flow tubes 130, 130' bend at two symmetrical locations along their length and are essentially parallel throughout their length. Brace bars 140 and 140' serve to define the axis W and W' about which each multichannel flow tube 130, 130' oscillates. The legs 131, 131' and 133, 133' of the multichannel flow tubes 130, 130' are fixedly attached to flow tube mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the flow tube mounting block 120 having a surface 121. Within the manifold 150, the material is divided and routed through the multichannel flow tubes 130, 130'. Upon exiting the multichannel flow tubes 130, 130', the process material is recombined in a single stream within the flow tube mounting block 120' having a surface 121' and the manifold 150' and is thereafter routed to outlet end 104' connected by the flange 103' having holes 102' to the process line (not shown).

The multichannel flow tubes 130, 130' are selected and appropriately mounted to the flow tube mounting blocks 120, 120' to have substantially the same mass distribution, moments of inertia and Young's modulus about bending axes W-W and W'-W', respectively. These bending axes go through the brace bars 140, 140'.

Both multichannel flow tubes 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the multichannel flow tube 130' and an opposing coil mounted to the multichannel flow tube 130 and through which an alternating current is passed for vibrating both multichannel flow tubes 130, 130'. A suitable drive signal is applied by the meter electronics 20, via lead 185, to the driver 180.

The meter electronics 20 receives the left and right sensor signals appearing on leads 165l, 165r, respectively. The meter electronics 20 produces the drive signal appearing on lead 185 to driver 180 and vibrate multichannel flow tubes 130, 130'. The meter electronics 20 processes the left and right sensor signals and the RTD signal to compute the mass flow rate and the density of the material passing through meter assembly 10. This information, along with other information, may be transmitted by meter electronics 20 over communications path 26.

While FIG. 1 depicts a single meter assembly 10 in communication with meter electronics 20, those skilled in the art will readily appreciate that multiple sensor assemblies may be in communication with meter electronics 20. Further, meter electronics 20 may be capable of operating a variety of different sensor types. Each sensor assembly, such as the meter assembly 10 in communication with meter electronics 20, may have a dedicated section of a storage system within meter electronics 20.

Meter electronics 20 may include various other components and functions, as will be understood by those of skill. These additional features may be omitted from the description and the figures for brevity and clarity.

Vibratory meter 5 includes multichannel flow tubes 130, 130'. Multichannel flow tubes 130, 130' have a plurality of fluid channels through which a material, such as a single phase or multiphase fluid, can flow. That is, the fluid flowing through the multichannel flow tubes 130, 130' may flow through two or more fluid channels. The multichannel flow tubes 130, 130' may improve errors in multiphase measurement by addressing issues associated with fluid decoupling, VOS errors, or flow profile effects.

Figure 2:
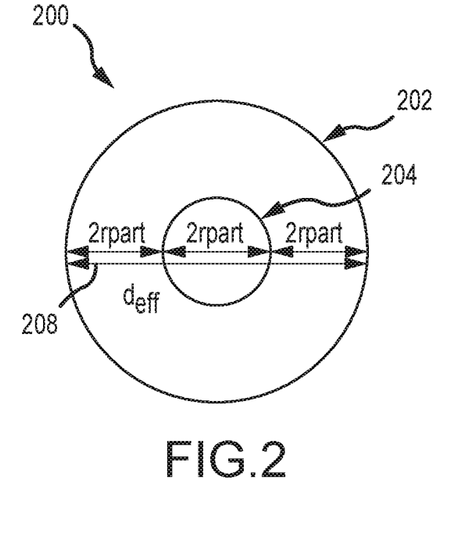
FIG. 2 depicts a cross-section of a flow tube of a vibratory flowmeter.

FIG. 2 depicts a flow tube 200. Flow tube 200 includes a tube perimeter wall 202. A decoupling error may be caused in a vibratory flow meter including flow tube 200 when a multiphase fluid having a bulk fluid, for example a liquid or gas, includes particles, for example liquid droplets, solids, or gas bubbles, having a density that is different from the bulk fluid. The decoupling of particles within the multiphase fluid during the vibration of the flow tube 200 provides a source of error in vibratory meter measurements.

When flow tube 200 is oscillated with a multiphase fluid, the distribution of particles within the bulk fluid may not represent a uniform distribution of particles in an infinite liquid medium. Also, wall effects can prevent decoupling of particles in a bulk fluid from occurring in areas near to tube perimeter wall 202. It has been shown computationally that wall effects are negligible unless a particle is within a distance of two particle radii from the wall. (Fischer P F et al. 2005. Influence of wall proximity on the lift and drag of a particle in an oscillatory flow. J. Fluids Eng. 127:583-595). For a tube diameter of $d_{eff}$ and a particle radius $r_{part}$, the following relationship therefore describes when wall effects prevent particle decoupling:

$$d_{eff} \leq 6 r_{part} \qquad \text{(Equation 1)}$$

Although tube perimeter wall 202 is depicted in FIG. 2 as being of negligible thickness, tube diameter $d_{eff}$ references the inner diameter within a flow tube, through which fluid may be free to flow.

FIG. 2 depicts this relationship schematically with example particle 204. Particle 204 is constrained from decoupling due to wall effects because the effective diameter $d_{eff}$ 208 of flow tube 200 is equal to $6r_{part}$.

For many vibratory meters, however, multiphase fluid particles would be small compared to the tube diameter, and wall effects are negligible. This provides for decoupling and large measurement errors.

It is possible to use the inverse Stokes number as a measure of particle decoupling. The inverse Stokes number δ, represents a ratio of the oscillation time scale to the viscous diffusion time scale. This parameter can provide an extremely important way to predict the motion of an oscillating particle. The inverse Stokes number relates kinematic viscosity v, frequency ω, and particle radius $r_{part}$:

$$\delta = \sqrt{\frac{2v}{\omega r_{part}^2}} \qquad \text{(Equation 2)}$$

When the inverse Stokes number δ for a multiphase fluid is large, the amplitude of decoupling is low. Low inverse Stokes numbers may correspond to high amounts of decoupling when the kinematic viscosity of a fluid is low, the particle size is high, or the meter vibration frequency ω is high. By combining Equations 1 and 2, it is possible to express $d_{eff}$ in terms of the inverse Stokes number δ:

$$d_{eff} \leq 6\sqrt{\frac{2v}{\omega \delta^2}} \qquad \text{(Equation 3)}$$

As may be seen from Equation 3, a very high frequency meter may benefit from a smaller effective diameter to prevent decoupling at a given particle size. Because the inverse Stokes number δ may account for a range of drive frequency ω values and particle radii $r_{part}$ values, Equation 3 may be used to create a vibratory meter configured to measure a wide range of multiphase fluids.

In examples, $d_{eff}$ may be less than 0.3 inches. In further examples, $d_{eff}$ may be between 0.25 and 0.3 inches. In further examples, however, $d_{eff}$ may be any other value that may provide wall effects benefits described above, as will be understood by those of skill.

In examples, particle radius $r_{part}$ may represent a distribution of particle sizes that are related to surface tension, turbulence (flow rate), or other factors of the multiphase fluid. In further examples, particle radius $r_{part}$ may represent a mean or a median of a distribution of particle sizes.

By solving Equation 3 for drive frequency ω, it may be possible to determine a drive frequency ω to operate a vibratory meter that will minimize decoupling for a multiphase fluid with a known kinematic viscosity v, inverse stokes number δ, and a multichannel flow tube with a known effective diameter $d_{eff}$:

$$\omega \leq \frac{72v}{\delta^2 d_{eff}^2}. \qquad \text{(Equation 4)}$$

In examples, frequency ω may be 100 Hz or less.

In addition to the decoupling errors caused by the relative motion of bubbles and particles in a multiphase fluid, Coriolis meters may also experience velocity of sound effects when the sonic velocity of the measurement fluid is low, or the oscillation frequency ω of the meter is high. Gases have lower sonic velocities than liquids, and low velocities may result from a mixture of the two. The addition of even a small amount of gas to a liquid may result in a dramatic reduction in the velocity of sound of the multiphase fluid below that of either independent phase.

The oscillation of a flow tube may produce sound waves that oscillate in the transverse direction at the drive frequency of the meter. When the velocity of sound of the fluid is high, as it may be for a single-phase liquid, the first acoustic mode for transverse sound waves across the circular conduit may be at a much higher frequency than the drive frequency. However, when the velocity of sound drops, due for example, to the addition of gas to a liquid, the frequency of the acoustic mode also drops. When the frequency of the acoustic mode and the drive mode are close, meter errors result due to the off-resonance excitation of the acoustic mode by the drive mode. For small diameter or low frequency meters at typical process pressures, velocity of sound effects can be negligible with respect to the specified accuracy of the meter. However, for large diameter or high frequency Coriolis meters, the velocity of sound can be low enough to cause significant measurement errors due to interaction between the drive and fluid vibration modes.

As described by Hemp and Kutin in 2006 (J. HEMP AND J. KUTIN. 2006. Theory of errors in Coriolis flowmeter readings due to compressibility of the fluid being metered. *Flow Measurement and Instrumentation.* 17:359-369.), in applications where velocity of sound effects (VOS) may be a concern, the following equation predicts the mass flow error $\dot{m}_{VOS,err}$, expressed as a percentage of flow error:

$$\dot{m}_{VOS,err} = \frac{1}{2}\left(\frac{\omega d_{eff}}{2c}\right)^2 \times 100, \quad \text{(Equation 5)}$$

where c is the speed of sound in the fluid, and ω is the drive frequency of the flow tube. For an error threshold $\dot{m}_{VOS,err}$ of 0.1% of mass flow $\dot{m}$, the following constraint may be established:

$$d_{eff} \leq 0.0894 \frac{c}{\omega}. \quad \text{(Equation 6)}$$

For example, when ambient air, with a speed of sound c of 13,504 in/s, is measured with a flow meter operating at a drive frequency 300 Hz, resulting in an angular velocity of 2*π*300=1,885 rad/s, with a multichannel flow tube with an effective diameter $d_{eff}$ that is less than 0.640 inches, a 0.1% error threshold $\dot{m}_{VOS,err}$ may be achieved.

In other applications, including single phase and multiphase fluids, flow profile effects can be a concern. The ratio of the length (L) of the flow tube to its diameter (D), or inner diameter, is an important meter consideration when flow profile effects are at issue. Larger vibratory meters tend to have relatively low L/D ratios. Extensive laboratory experimentation has shown that flow meters with L/D ratios that are 25 or above have fewer flow profile effects. For a tube bundle meter, the effective diameter $d_{eff}$ may therefore be selected to meet the following constraint:

$$d_{eff} \leq \frac{L}{25} \quad \text{(Equation 7)}$$

For example, a flow meter with an active flow tube length L of 75 inches would have reduced flow effects if effective diameter $d_{eff}$ was less than 3 inches. For a flow tube with a flow tube perimeter having a diameter of 4.5 inches, a single baffle may eliminate the LD effect.

Figure 3:
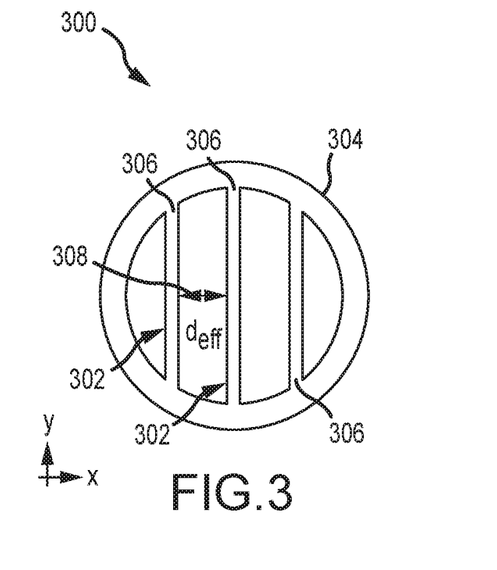
FIG. 3 depicts a cross-section of a multichannel flow tube, in accordance with an example.
Figure 4:
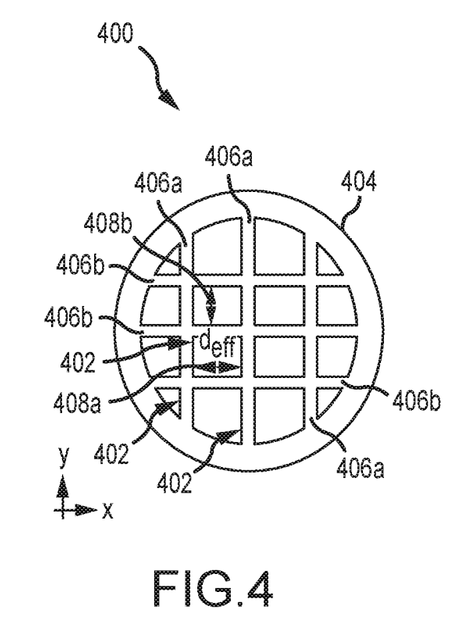
FIG. 4 depicts a cross-section of a multichannel flow tube, in accordance with an example.
Figure 5:
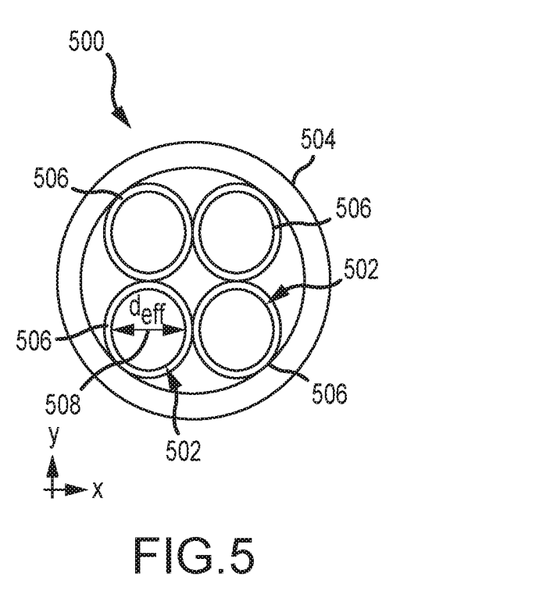
FIG. 5 depicts a cross-section of a multichannel flow tube, in accordance with an example.

Multi-channel flow tubes with effective diameters $d_{eff}$ determined according to the equations provided above may improve the accuracy of vibratory meter measurement by addressing issues associated with fluid decoupling, velocity of sound (VOS) effects, and flow effects. The multi-channel flow tubes 300, 400, 500 described below may help reduce these error mechanisms from occurring in the first instance, instead of removing these errors in post processing, as taught by the prior art. The multi-channel flow tubes 300, 400, 500 may also reduce the flow profile effects by effectively increasing the tube length (L) to tube diameter (D) ratio without increasing the size of the flow meter, as is explained in more detail below.

FIG. 3 depicts a cross-section of example multichannel flow tube 300, according to an example. A reference coordinate system with x and y-axes is depicted on each of FIGS. 3-5 for clarity. Multichannel flow tube 300 comprises two or more fluid channels 302 formed by a tube perimeter wall 304 and one or more channel divisions 306. In the example of multichannel flow tube 300, the tube perimeter wall 304 is substantially circular in shape. In some examples, substantially circular may mean more than 50% of tube perimeter wall 304 is circular in shape. In further examples, substantially circular may mean more than 75% of tube perimeter wall 304 is circular in shape. In further examples, however, tube perimeter wall 304 may be any other shape, as will be understood by those of skill. In example multichannel flow tube 300, the one or more channel divisions 306 are substantially straight walls that are arranged to be parallel with one another. The channel divisions 306 are coupled to tube perimeter wall 304 at their ends.

The areas between the interior surface of tube perimeter wall 304 and the channel divisions 306 define one or more fluid channels 302, through which fluid may flow within the multichannel flow tube. At least one of one or more fluid channels 302 may have an effective diameter $d_{eff}$ 308, or the distance at the widest point between adjacent sections of tube perimeter wall 304 and/or channel divisions 306, in a first direction. For example, one or more of fluid channels 302 may have an effective diameter $d_{eff}$ in the x direction. In examples, the x direction may be the direction in which multichannel flow tube 300 is primarily oscillated. In further examples, however, the x direction may be different from the direction in which multichannel flow tube 300 is primarily oscillated. Effective diameter $d_{eff}$ 308 may therefore help prevent decoupling of particles from a multiphase fluid in the drive direction.

FIG. 4 depicts a cross-section of multichannel flow tube 400, in accordance with an example. Multichannel flow tube 400 comprises two or more fluid channels 402 formed by a tube perimeter wall 404 and one or more channel divisions 406a, 406b. In the example of multichannel flow tube 400, the tube perimeter wall 404 is substantially circular in shape.

Like multichannel flow tube 300, multichannel flow tube 400 includes a first set of channel divisions 406a that are substantially straight walls, arranged in a substantially parallel configuration with one another, and coupled to tube perimeter wall 404 at their respective ends. Multichannel flow tube 400 further includes a second set of channel divisions 406b that are arranged to be perpendicular to the first set of channel divisions 406a, however.

Some of fluid channels 402 are therefore formed between adjacent tube perimeter wall 404, channel divisions 406a, and channel divisions 406b, and some of fluid channels 402 are formed between adjacent channel divisions 406a and 406b. At least one fluid channel 402 may have an effective diameter $d_{eff}$ 408a, or the distance at the widest point between adjacent sections of tube perimeter wall 404 and/or opposing channel divisions 406a or 406b, in a first direction. For example, one or more of fluid channels 402 may have an effective diameter $d_{eff}$ 408a in the x direction. At least one of one or more fluid channels 402 may further have an effective diameter $d_{eff}$, in a second direction. For example, one or more fluid channels 402 may further have an effective diameter $d_{eff}$ 408b in the y direction. By including one or more fluid channels with effective diameter $d_{eff}$ 408a in the first direction and effective diameter $d_{eff}$ 408b in the second direction, it may be possible to prevent decoupling of particles from a multiphase fluid in a vibratory meter when driving a multichannel tube will include displacement in more than one direction, for example when a flow tube will twist or rotate around an axis such as axis W or W'.

FIG. 5 depicts a cross-section of a further multichannel flow tube 500, in accordance with an example. Multichannel flow tube 500 comprises a tube perimeter wall 504, and two or more fluid channels 502. Fluid channels 502 are formed by one or more channel divisions 506. Channel divisions 506 are substantially circular in shape.

In the example of multichannel flow tube 500, effective diameter $d_{eff}$ 508 is the diameter of each respective channel division 506. Because the effective diameter $d_{eff}$ 508 is substantially the same in every direction within the plane of the cross section, multichannel flow tube 500 may help prevent decoupling of particles from a multiphase fluid in any direction.

The examples of multichannel flow tubes 300, 400, and 500 are not intended to be limiting. As will be understood by those of skill, in further examples, multichannel flow tubes may include different configurations of tube perimeter wall. In further examples, multichannel flow tubes may include any number or orientation of channel divisions that allow for the formation of an effective diameter $d_{eff}$ in at least one dimension according to Equations 3, 6 or 7.

In examples, multichannel flow tubes 300, 400, or 500 may include channel divisions 306, 406, or 506 along the entire length of the flow tube. In other examples, the channel divisions may only extend along the vibrating region of the flow tube. In further examples, however, the channel divisions may only extend along a portion of the vibrating region of the multichannel flow tube, to balance the error reducing effects of the fluid channels with the potential pressure drop that they may cause in the multichannel flow tube 300, 400, or 500.

A multi-channel flow tube 300, 400, 500 may reduce or eliminate these problems relating to multiphase decoupling, VOS, or flow effects because the effective tube diameter, $d_{eff}$, may be considerably less than a standard flow tube. Advantageously, prior flow meters may be retrofitted with multichannel flow tubes having the $d_{eff}$ described in any of Equations 3, 6 or 7 to gain the advantages provided by a smaller flow tube effective diameter $d_{eff}$.

Because multichannel flow tubes 300, 400, 500 have a lower effective diameter $d_{eff}$, they may be used to increase the L/D ratios of higher flow rate vibratory meters to eliminate flow profile effect in larger vibratory meters. In fact, a multi-channel flow tube with individual tube diameters even one half as large as the tube perimeter wall 302, 402, or 502 would result in L/D ratios above 25 for vibratory meters of many common sizes. Additionally, multichannel flow tubes can be used to allow for a more compact Coriolis meter in any line size that does not suffer from flow profile effects.

Figure 11:
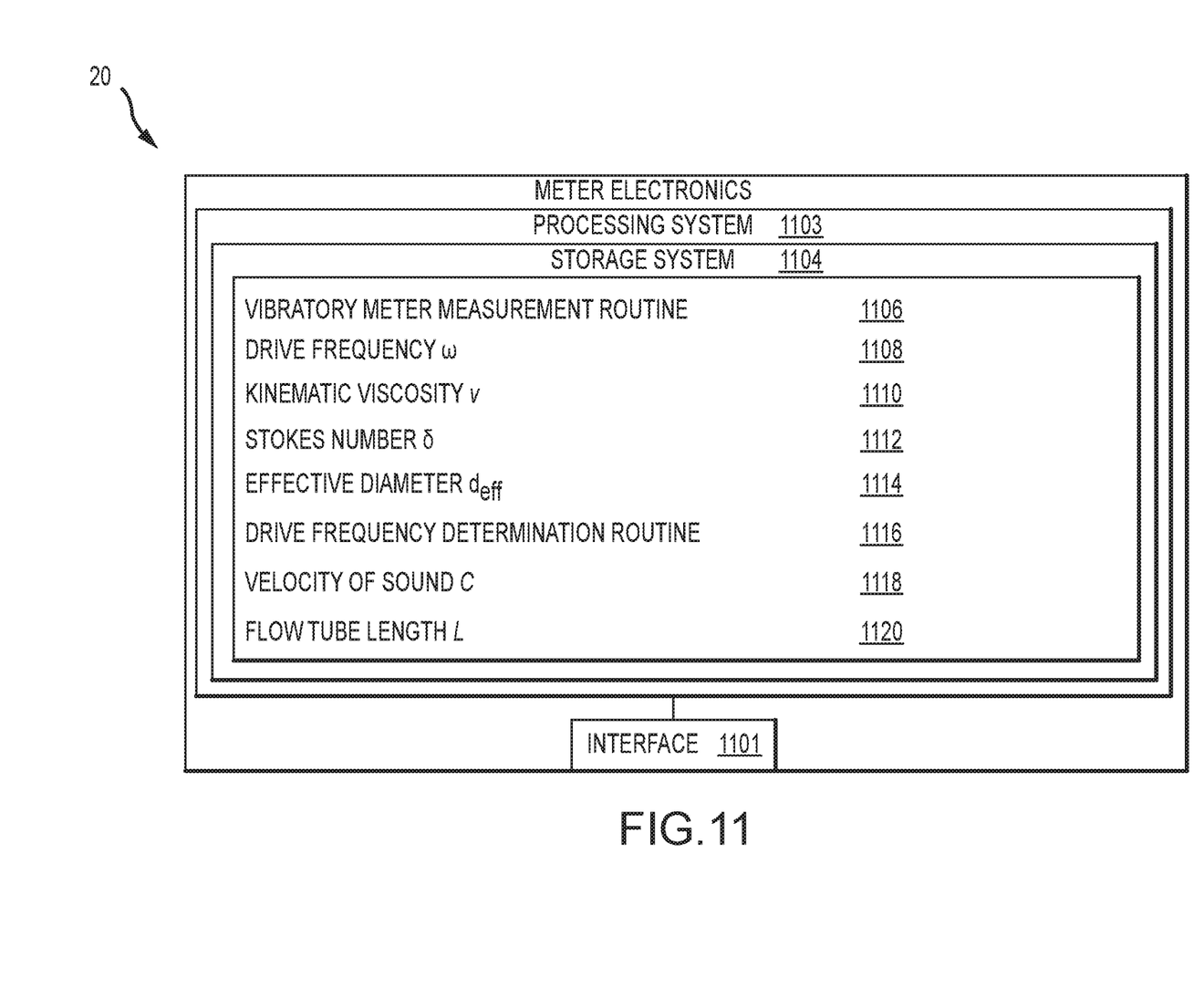
FIG. 11 depicts a meter electronics, in accordance with an example.

FIG. 11 depicts meter electronics 20 of the vibratory meter 5 according to an example of the Application. Meter electronics 20 may include an interface 1101 and a processing system 1103. The processing system 1103 may include a storage system 1104. As previously discussed, meter electronics 20 may generate a drive signal to supply to driver 180 and receive signals from pickoff sensor(s) 1701, 170r. Meter electronics 20 may operate meter assembly 10 as a density meter, a viscosity meter, or a flow meter such as a Coriolis mass flow meter. It should be appreciated that meter electronics 20 may also operate other types of vibrating meters, and the examples provided should not limit the scope of the present invention. Meter electronics 20 may process vibratory sensor signals to obtain one or more characteristics of the fluid passing through multichannel flow tube(s) 130, 130'.

Interface 1101 may receive sensor signals from the driver 180, or pickoff(s) 1701, 170r, via leads 100. Interface 1101 may perform any necessary or desired signal conditioning, such as any manner of formatting, amplification, buffering, etc. Alternatively, some or all the signal conditioning may be performed in processing system 1103. In addition, interface 1101 may enable communications between meter electronics 20 and external devices. In addition, interface 1101 may enable communications between meter electronics 20 and external devices, for example. Interface 1101 may be capable of any manner of electronic, optical, or wireless communication.

Interface 1101 in one example may include a digitizer (not shown), wherein meter assembly 10 signals comprise analog sensor signals. The digitizer may sample and digitize the analog sensor signals and produce digital sensor signals. The digitizer may also perform any needed decimation, wherein the digital sensor signal is decimated to reduce the amount of signal processing needed and to reduce the processing time.

Processing system 1103 conducts operations of meter electronics 20 and processes density/viscosity/flow measurements from meter assembly 10. Processing system 1103 may also execute one or more processing routines such as vibratory meter measurement routine 1106 and/or drive frequency determination routine 1116.

Processing system 1103 may comprise a general purpose computer, a micro-processing system, a logic circuit, or any other general purpose or customized processing device capable of performing the functions described herein. Processing system 1103 may be distributed among multiple processing devices. Processing system 1103 may include any manner of integral or independent electronic storage medium, such as storage system 1104.

Storage system 1104 may store meter parameters and data, software routines, constant values, and variable values. Storage system 1104 may comprise a primary or main memory, such as a random access memory (RAM). In examples, storage system 1104 may include a hard disk drive, a removable storage device, a memory card, a floppy disk drive, a magnetic tape drive, a compact disk drive, a digital versatile disc, a Blue-ray disc, an optical storage device, tape backup, or any other computer useable or readable storage medium. In examples, storage system 1104 may comprise a non-transitory media.

Storage system 1104 may further store variables that may be used by vibratory meter measurement routine 1106 and/or drive a drive frequency determination routine 1116. For example, storage system 1104 stores a drive frequency ω 1108, a kinematic viscosity ν 1110, a Stokes number δ 1112, an effective diameter $d_{eff}$ 1114, velocity of sound c 1118, or flow tube length L, as described above.

In an example, the storage system 1104 includes routines that are executed by the processing system 1103. For example, the storage system 1104 may store vibratory meter measurement routine 1106 and/or drive frequency determination routine 1116. Meter electronics 20 may initiate vibratory meter measurement routine 1106 to take a measurement of a fluid using meter assembly 10. In examples, vibratory meter measurement routine 1106 may determine mass flow, density, or viscosity of a process fluid, as described above. Meter electronics 20 may further initiate drive frequency determination routine 1116. In examples, drive frequency determination routine 1116 may be used to determine a drive frequency ω 1108 used to operate the vibratory meter 5 using vibratory meter measurement routine 1106.

FIGS. 6, 7, 8, 9, and 10 depict methods 600, 700, 800, 900, and 1000 respectively. Steps 604 and 606 of method 600, steps 708 and 710 of method 700, steps 804 and 806 of method 800, steps 908 and 910 of method 900, and steps 1004 and 1006 of method 1000 each comprise examples of vibratory meter measurement routine 1106. Steps 702, 704, and 706 of method 700, and steps 902, 904, and 906 of method 900 comprise an example of drive frequency determination routine 1116. Processing system 1103 may be configured to perform the necessary signal and data processing to execute vibratory meter measurement routine 1106 and/or drive frequency determination routine 1116, which may include performing any combination of sensor verification methods 600, 700, 800, 900, or 1000.

Figure 6:
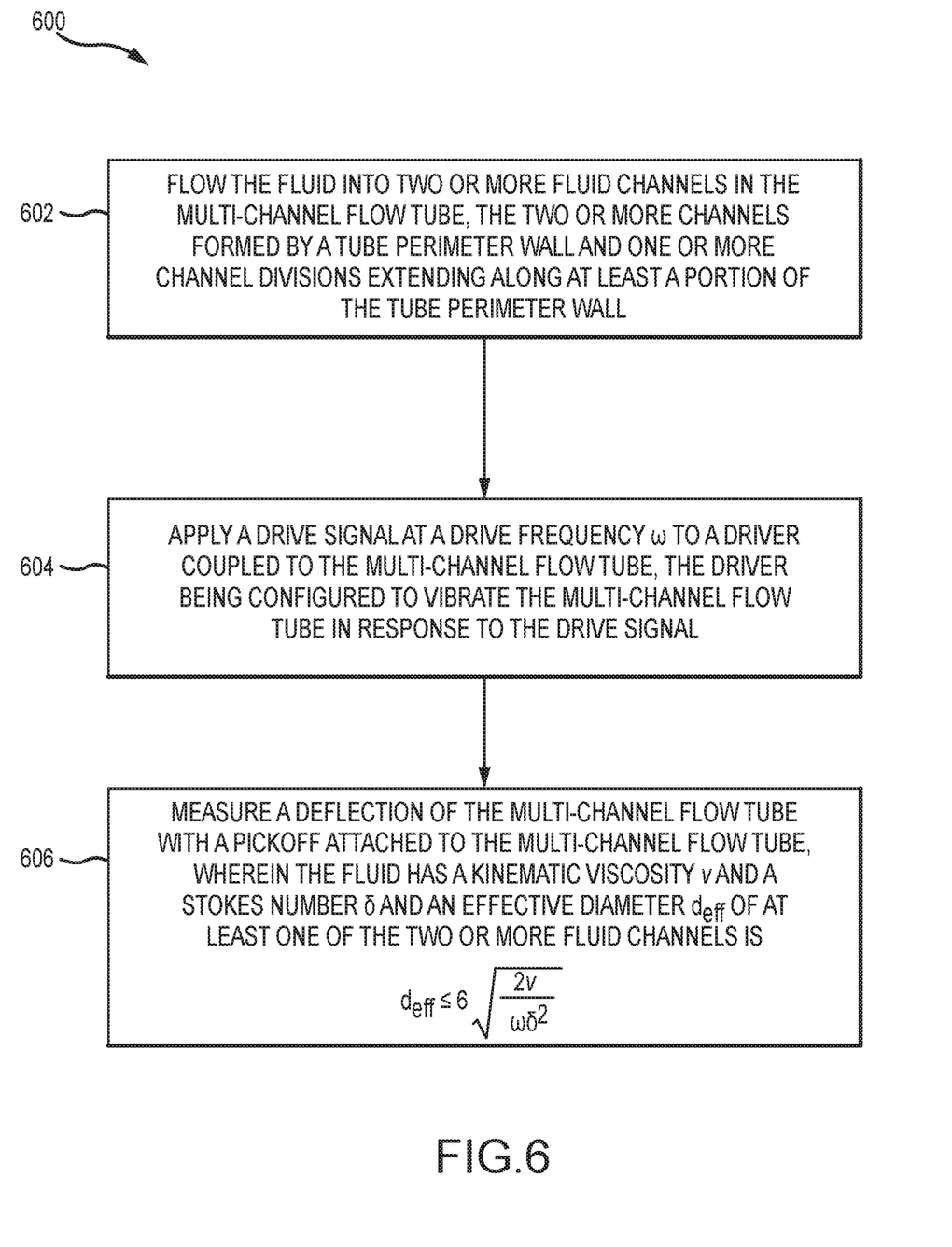
FIG. 6 depicts a method, in accordance with an example.

FIG. 6 depicts method 600, in accordance with an example. Method 600 may be executed to measure a fluid with a vibratory flow meter including a multichannel flow tube. Method 600 begins with step 602. In step 602, fluid is flowed into two or more fluid channels in the multichannel flow tube, the two or more channels formed by a tube perimeter wall and one or more channel divisions extending along at least a portion of the tube perimeter wall.

For example, fluid may flow into two or more fluid channels 302, 402, 502 in multichannel flow tube 300, 400, 500 formed by tube perimeter wall 304, 404, 504 and one or more channel divisions 306, 406, 506.

Method 600 continues with step 604. In step 604, a drive signal is applied to a driver coupled to the multichannel flow tube, the driver being configured to vibrate the multichannel flow tube at a drive frequency ω in response to the drive signal.

For example, a drive signal may be applied from meter electronics 20 over lead 185 to driver 180. Driver 180 may cause multichannel flow tubes 300, 400, 500 to vibrate at drive frequency ω in response to the drive signal.

Method 600 continues with step 606. In step 606, a deflection of the multichannel flow tube is measured with a pickoff attached to the multichannel flow tube, wherein the fluid has a kinematic viscosity V and an inverse Stokes number δ and an effective diameter $d_{eff}$ of at least one of the two or more fluid channels is $$d_{eff} \leq 6\sqrt{\frac{2v}{\omega\delta^2}}.$$

For example, a deflection of multichannel flow tubes 300, 400, 500 may be measured with pickoff 170l and/or 170r attached to the multichannel flow tube. The at least one of the two or more fluid channels 302, 402, 502 include effective diameter $d_{eff}$ 308, 408, 508, which may be determined as described in Equation 3.

Method 600 may provide for improved accuracy in measuring by preventing particle decoupling in a greater range of multiphase fluids, including a variety of bulk fluids and particle sizes.

Figure 7:
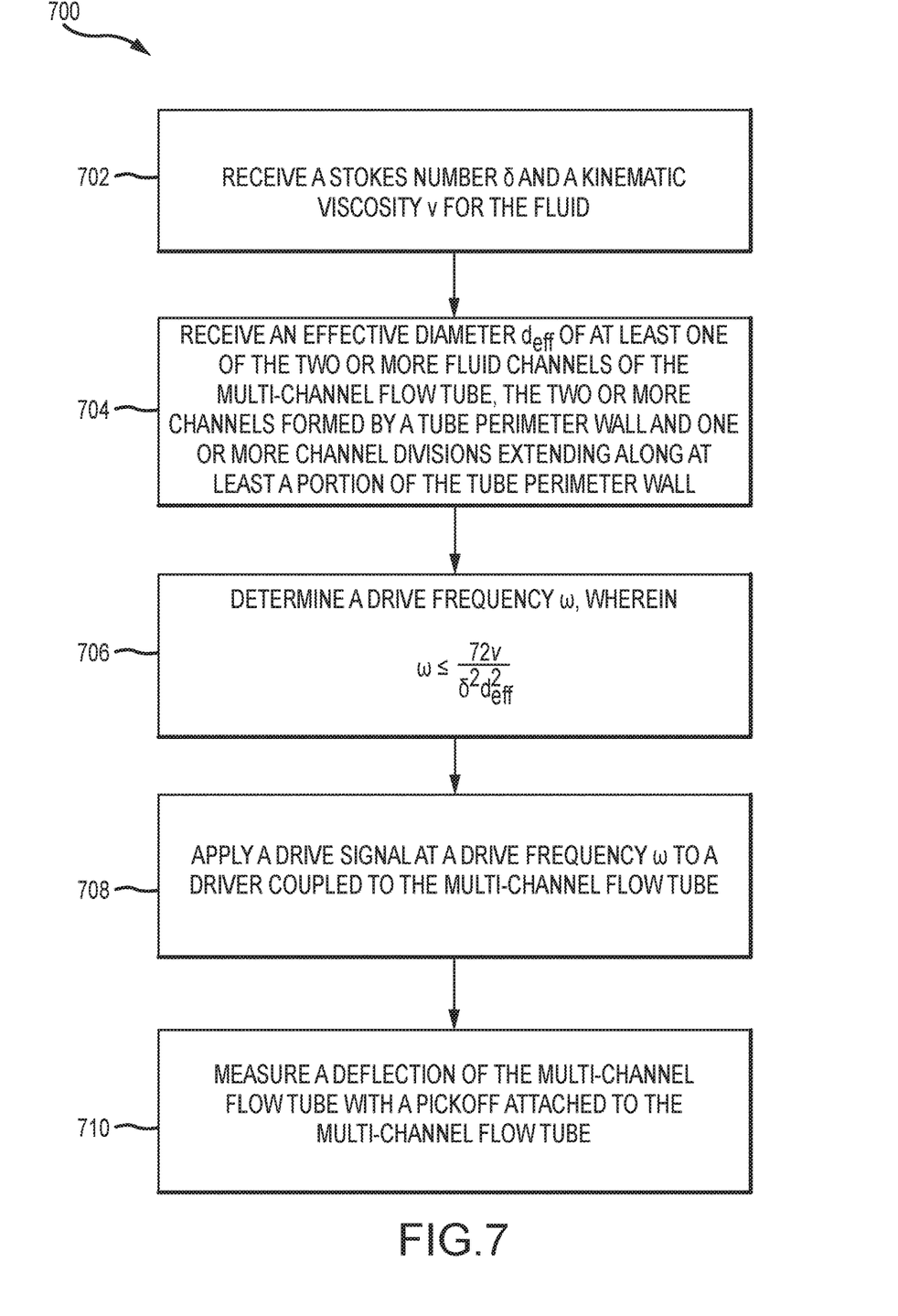
FIG. 7 depicts a method, in accordance with an example.

FIG. 7 depicts method 700, in accordance with an example. Method 700 may be applied to measure a fluid with a vibratory meter comprising a multichannel flow tube.

Method 700 begins with step 702. In step 702, kinematic viscosity v 1110 and/or inverse Stokes number δ 1112 are received for the fluid. Kinematic viscosity v 1110 and/or inverse Stokes number δ 1112 may be input by a user and saved to storage system 1104. For example, kinematic viscosity v 1110 and/or inverse Stokes number 1112 may be input at the beginning of a measurement operation, upon installation of a sensor at a customer site, or at any other time. In other examples, kinematic viscosity v 1110 and/or inverse Stokes number δ 1112 may be received via electronic message at meter electronics 20.

Method 700 continues with step 704. In step 704, effective diameter $d_{eff}$ 1114 is received for at least one of the two or more fluid channels of the multichannel flow tube, the two or more channels formed by a tube perimeter wall and one or more channel divisions. In examples, effective diameter $d_{eff}$ 1114 may be input by a user and saved to storage system 1104. For example, effective diameter $d_{eff}$ 1114 may be input at the beginning of a measurement operation, upon installation of a sensor at a customer site, upon assembly of the sensor, or at any other time. In other examples, effective diameter $d_{eff}$ 1114 may be received via electronic message at meter electronics 20.

Method 700 continues with step 704. In step 706, drive frequency ω 1108 is determined, wherein drive frequency $$\omega \leq \frac{72v}{\delta^2 d_{eff}^2}.$$

For example, drive frequency ω 1108 may be calculated as described with regards to Equation 4 above.

Method 700 continues with step 708. In step 708, a drive signal is applied to a driver coupled to the multichannel flow tube. For example, a drive signal may be applied from meter electronics 20 over lead 185 to driver 180. Driver 180 may cause multichannel flow tubes 300, 400, 500 to vibrate at drive frequency ω 1108 in response to the drive signal.

Method 700 continues with step 710. In step 710, a deflection of the multichannel flow tube is measured with a pickoff attached to the multichannel flow tube. For example, a deflection of multichannel flow tubes 130 and 130' may be measured with pickoff 170l and/or pickoff 170r. The signal(s) from pickoff(s) 170l and/or 170r may be transmitted via lead(s) 165l and/or 165r to meter electronics 20.

Method 700 may provide for improved accuracy in measuring by preventing decoupling in a greater range of multiphase fluids, including a variety of bulk fluids and particle sizes in a flow meter using a high frequency ω.

Figure 8:
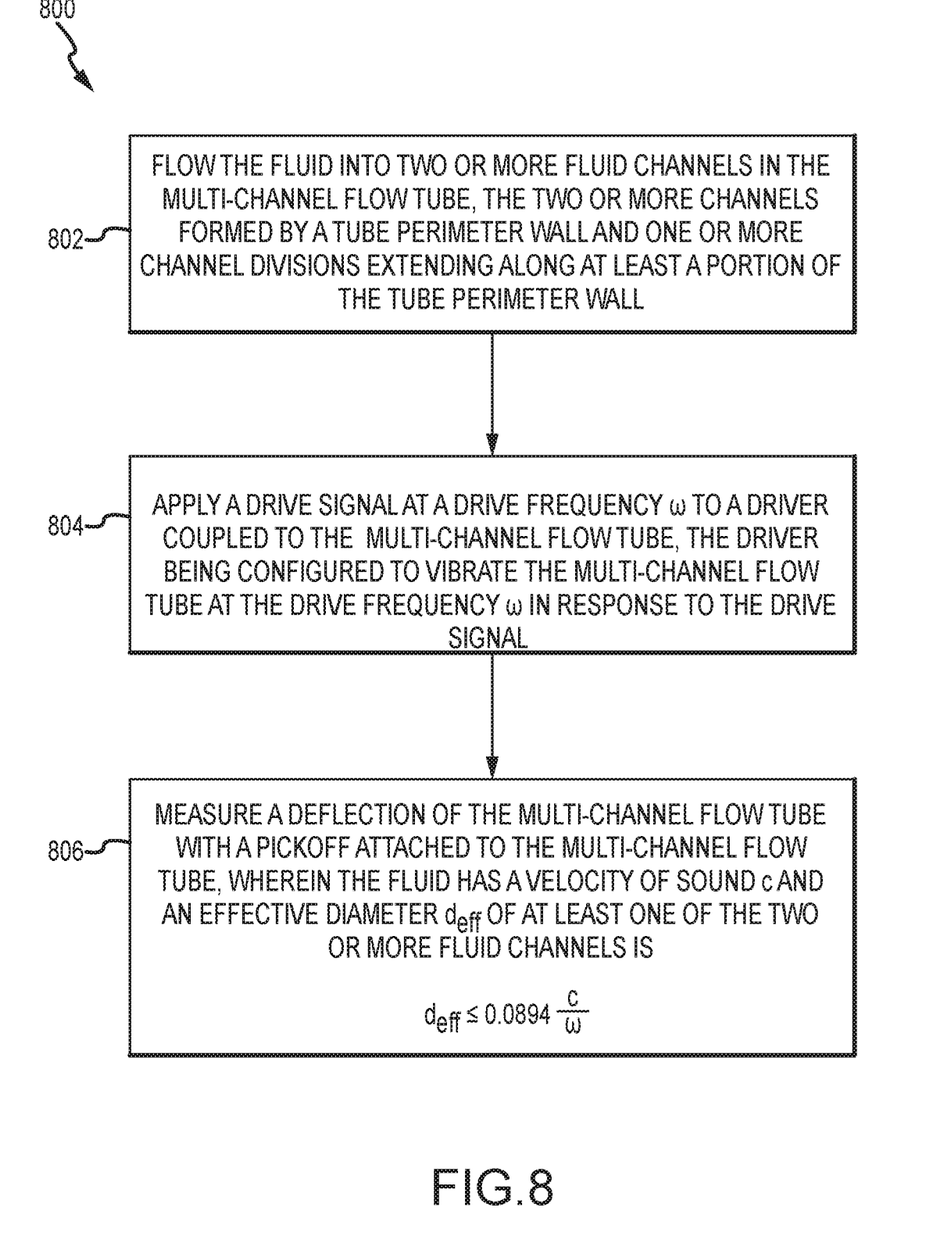
FIG. 8 depicts a method, in accordance with an example.

FIG. 8 depicts method 800, in accordance with an example. Method 800 may be executed to measure a fluid with a vibratory flow meter including a multichannel flow tube.

Steps 802 and 804 are similar to steps 602 and 604, described above. Method 800 continues with step 806. In step 806, a deflection of the multichannel flow tube is measured with a pickoff attached to the multichannel flow tube, wherein the fluid has a velocity of sound c and an effective diameter $d_{eff}$ of at least one of the two or more fluid channels is:

$$d_{eff} \leq 0.0894 \frac{c}{\omega}.$$

For example, a deflection of multichannel flow tubes 300, 400, 500 may be may be measured with pickoff 170l and/or 170r attached to the multichannel flow tube. At least one of the two or more fluid channels 302, 402, 502 include effective diameter $d_{eff}$ 308, 408, 508, which may be determined as described in Equation 4.

Method 800 may provide for improved accuracy in measuring by preventing VOS errors in a greater range of fluids and meter frequency combinations.

Figure 9:
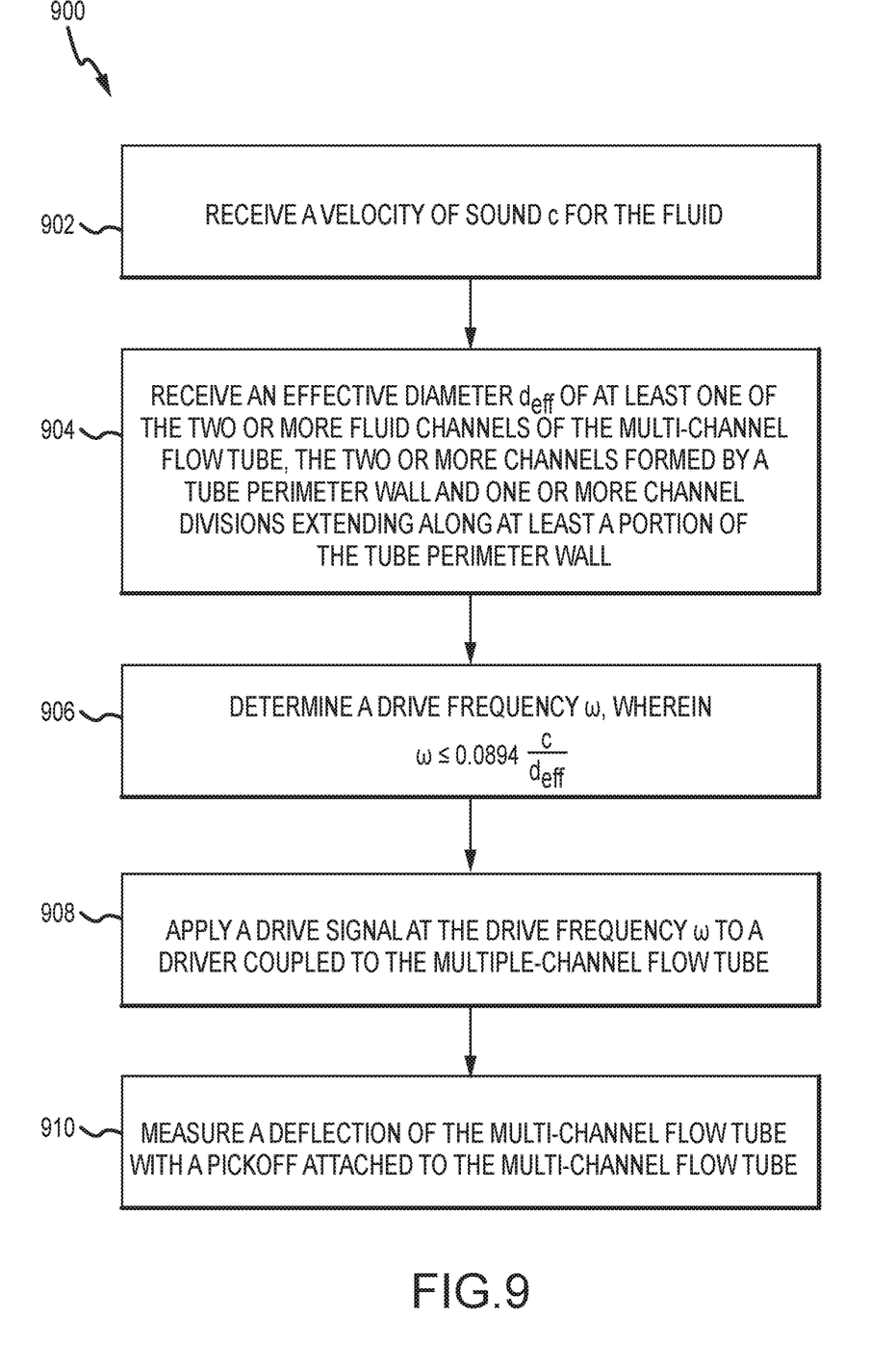
FIG. 9 depicts a method, in accordance with an example.

FIG. 9 depicts method 900, in accordance with an example. Method 900 may be executed to measure a fluid with a vibratory flow meter including a multichannel flow tube. Method 900 begins with step 902. In step 902, a velocity of sound c is received for a fluid. In examples, velocity of sound c may be input by a user, saved in memory, or received via another instrument such as a Coriolis mass flow meter.

Step 904 is similar to step 704, as described above with respect to method 700.

Method 900 continues with step 906. In step 906, a drive frequency ω is determined, wherein $$\omega \leq 0.0894 \frac{c}{d_{eff}}.$$

For example, drive frequency ω 1108 may be calculated as described with regards to Equation 6.

Steps 908 and 910 are similar to steps 708 and 710, as described above with respect to method 700.

Method 900 may provide for improved accuracy in measuring by preventing VOS errors in a greater range of fluids using frequency ω.

Figure 10:
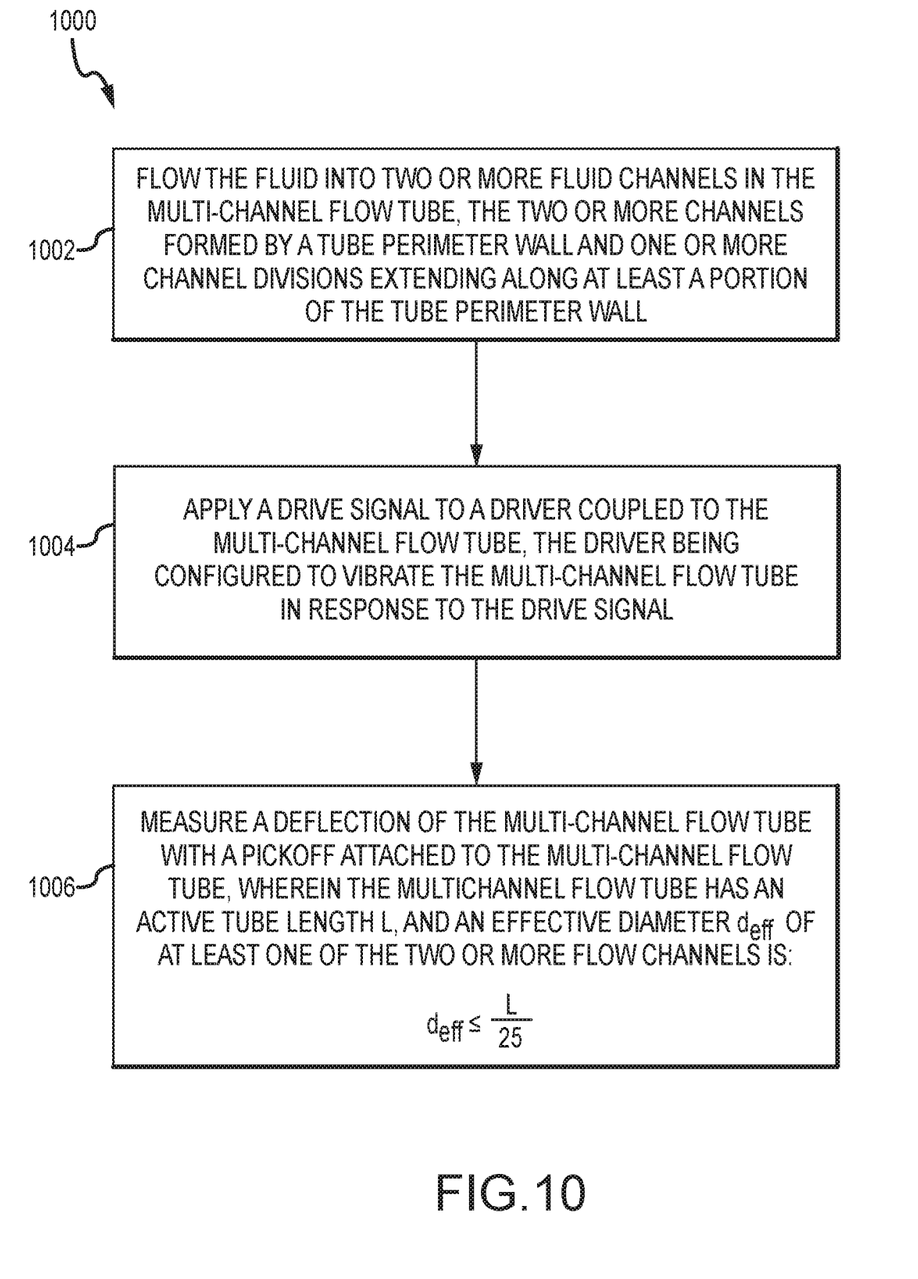
FIG. 10 depicts a method, in accordance with an example.

FIG. 10 depicts method 1000, in accordance with an example. Method 1000 may be executed to measure a fluid with a vibratory flow meter including a multichannel flow tube.

Steps 1002 and 1004 are similar to steps 602 and 604, described above. Method 1000 continues with step 1006. In step 1006, a deflection of the multichannel flow tube is measured with a pickoff attached to the multichannel flow tube, wherein the multichannel flow tube has an active tube length L, and an effective diameter $d_{eff}$ of at least one of the two or more fluid channels is:

$$d_{eff} \leq \frac{L}{25}.$$

Effective diameter $d_{eff}$ is determined using Equation 7, described above.

Method 1000 may provide for improved accuracy in measuring by preventing flow profile effects in larger meters, and may allow for designs that achieve further compactness while still avoiding flow profile effects.

The devices and methods disclosed herein may provide for improved accuracy of measurement of fluids by preventing the physical effects of decoupling, VOS errors, and flow profile errors in the first instance. Accordingly, the multichannel flow tubes 300, 400, and 500 may provide a similar capacity to single-channel flow tubes (i.e., flow tubes without the two or more fluid channels 302, 402, 502) while realizing benefits associated with the smaller effective diameter.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A method of measuring a fluid with a vibratory flow meter including a multichannel flow tube, the method comprising:

flowing the fluid into two or more fluid channels in the multichannel flow tube, the two or more channels formed by a tube perimeter wall and a length of the one or more channel divisions substantially equal to a vibrating length of the tube perimeter wall;

applying a drive signal to a driver coupled to the multichannel flow tube, the driver being configured to vibrate the multichannel flow tube in response to the drive signal; and measuring a deflection of the multichannel flow tube with a pickoff attached to the multichannel flow tube, wherein the multichannel flow tube has an active tube length L, and an effective diameter $d_{eff}$ of at least one of the two or more fluid channels is:

$$d_{eff} \leq \frac{L}{25}.$$

2. The method of claim 1, wherein the fluid is a multiphase fluid.

3. The method of claim 1, wherein each of the two or more fluid channels has the effective diameter $d_{eff}$ in at least a first dimension.

4. The method of claim 1, wherein at least one of the two or more fluid channels has an effective diameter $d_{eff}$ in a first dimension and a second dimension.

5. The method of claim 1, wherein the effective diameter $d_{eff}$ of the two or more fluid channels is less than 0.3 inches.

6. The method of claim 1, wherein the tube perimeter wall of the multichannel flow tube is substantially circular.

7. The method of claim 1, wherein the one or more channel divisions are substantially straight.

8. The method of claim 1, wherein the one or more channel divisions are substantially circular.

9. A vibratory meter (5) including a multichannel flow tube (300, 400, 500), the vibratory meter comprising:

a pickoff (170l, 170r) attached to the multichannel flow tube;

a driver (180) coupled to the multichannel flow tube, the driver being configured to vibrate the multichannel flow tube;

the multichannel flow tube comprising two or more fluid channels (302, 402, 502) formed by a tube perimeter wall (304, 404, 504) and a length of the one or more channel divisions (306, 406, 506) substantially equal to a vibrating length of the tube perimeter wall, the multichannel flow tube having an active tube length L, and an effective diameter $d_{eff}$ (1114) of at least one of the two or more fluid channels being:

$$d_{eff} \leq \frac{L}{25}.$$

10. The vibratory meter of claim 9, wherein each of the two or more fluid channels has the effective diameter $d_{eff}$ in a first dimension.

11. The vibratory meter of claim 9, wherein at least one of the two or more fluid channels has an effective diameter $d_{eff}$ in a first dimension and a second dimension.

12. The vibratory meter of claim 9, wherein the one or more channel divisions are substantially straight.

13. The vibratory meter of claim 9, wherein the one or more channel divisions are substantially circular.

14. The vibratory meter of claim 9, wherein the effective diameter $d_{eff}$ of the two or more fluid channels is less than 0.3 inches.

\* \* \* \* \*